W. A. FREDERICK.
CRANK CASE PAN FOR ENGINES.
APPLICATION FILED APR. 8, 1918.
1,281,548.
Patented Oct. 15, 1918.
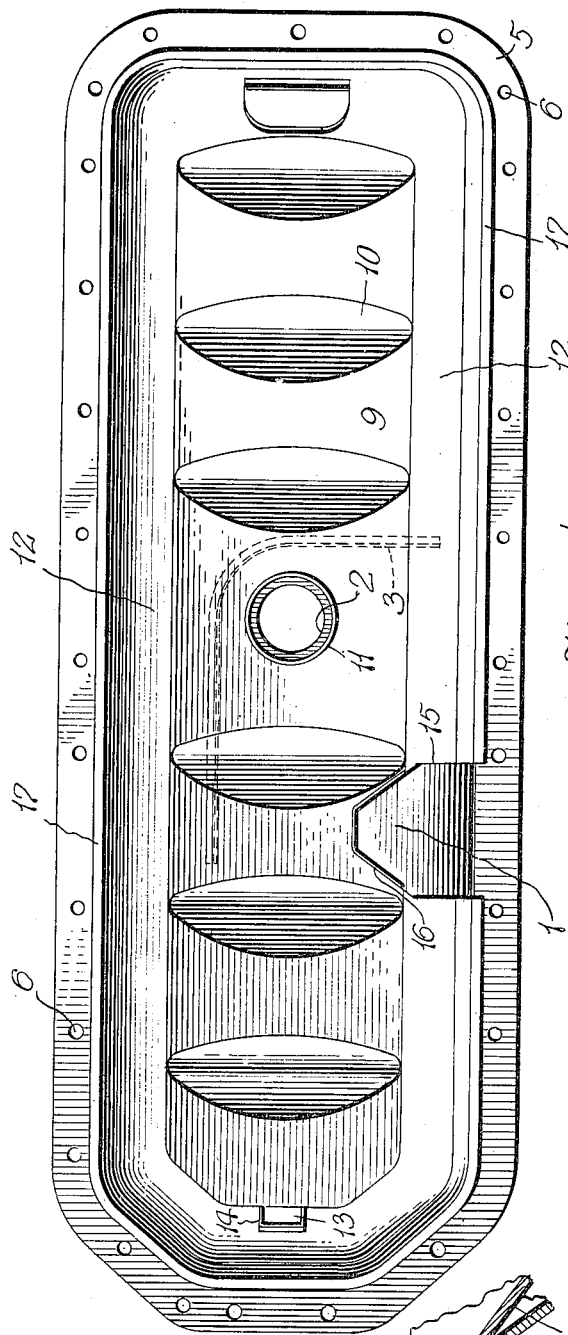
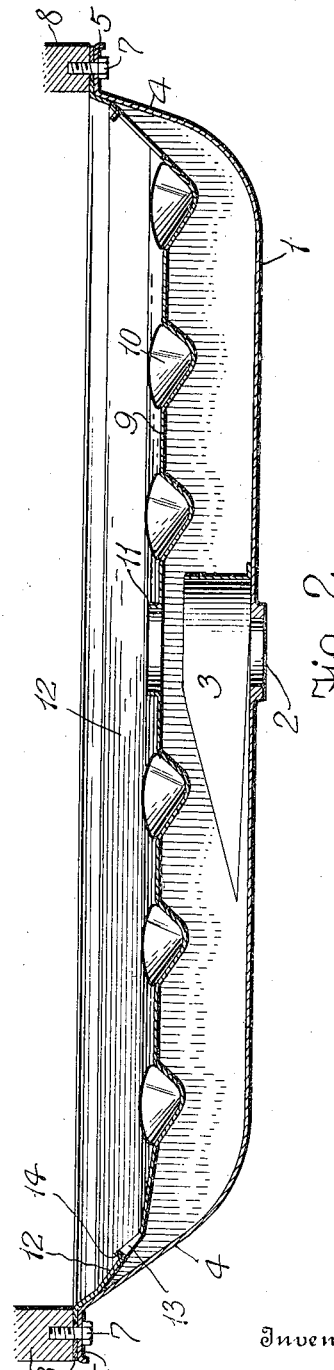
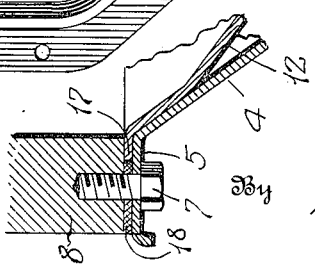
Witness
Chas W. Stauffiger
Karl H. Butler
Inventor
Walter A. Frederick,
By
Attorneys.

UNITED STATES PATENT OFFICE.

WALTER A. FREDERICK, OF DETROIT, MICHIGAN, ASSIGNOR TO CONTINENTAL MOTORS CORPORATION, OF DETROIT, MICHIGAN, A CORPORATION OF VIRGINIA.

CRANK-CASE PAN FOR ENGINES.

1,281,548.

Specification of Letters Patent.

Patented Oct. 15, 1918.

Application filed April 8, 1918. Serial No. 227,220.

*To all whom it may concern:*

Be it known that I, WALTER A. FREDERICK, a citizen of the United States of America, residing at Detroit, in the county of Wayne and State of Michigan, have invented certain new and useful Improvements in Crank-Case Pans for Engines, of which the following is a specification, reference being had therein to the accompanying drawings.

In the manufacture of oil pans for engines, particularly of the internal combustion type having splash, dipper or wipe systems of lubrication, it has been the practice to make a pan of pressed sheet metal and place in the same a tray or superposed lubricant holding member positioned so that the connecting rods of an engine or parts thereof may dip or wipe quantities of lubricant from the tray or member, and thus insure proper lubrication of bearings and parts of a crank shaft and connecting rods. In mounting the tray or member in the pan spot welding and soldering have been resorted to so as to secure the tray relative to the pan, but such fastening means has proved impractical for the following reasons.

First, on account of the size and shape of a pan and its tray or superposed member, it is practically impossible to shape the edges of the tray so that it will accurately fit the walls of the pan, and when spot welding and soldering are resorted to as a fastening means, interstices or spaces are left causing a leakage between the tray and its pan. Then again, it is impossible to form the edges of a tray so that there will always be a perfect abutting relation between the tray and its pan conducive to spot welding. Very often it is necessary to spring the edge of the tray to cause it to properly abut the wall of the pan and it has been found that after spot welding the juncture is not durable, eventually causing leakage.

Second, with the tray or superposed member spot welded and soldered in the pan, it was practically impossible to clean the pan and remove sediment from the cylinder lubricating oil. This, together with leakage, poor fitting, imperfections of manufacture, and skilled labor required to make the pan as near perfect as possible, have been a serious drawback in the production of engine crank cases, so I now aim to rectify such conditions by a simple, durable and inexpensive pan that fulfils all requirements in connection with an engine crank case.

My invention will be hereinafter described and then claimed, and reference will now be had to the drawings, wherein—

Figure 1 is a plan of the pan and its tray;

Fig. 2 is a longitudinal sectional view of the same; and

Fig. 3 is an enlarged detail sectional view of the marginal edges of the pan and tray.

In the drawing, the reference numeral 1 denotes a pan having the bottom thereof provided with an opening 2 and a lubricant deflector 3 adjacent said opening. The side and end walls 4 of the pan are provided with lateral flanges 5 and these flanges are apertured, as at 6.

It is preferable to form the pan 1 from sheet metal pressed to proper shape so that it may be connected by screw bolts 7 or other fastening means to the lower edges of a crank case 8, said screw bolts extending through the apertures 6 of the marginal flanges 5.

In the pan 1 is placed a tray or superposed member 9 having a plurality of transversely disposed dipper troughs 10, corresponding in number to the connecting rods of an engine. The tray 9 is of less depth than the pan 1, thus providing clearance for the deflector 3 and a space between the bottom of the tray and the bottom of the pan. The tray 9 has a central opening surrounded by an upstanding flange or sleeve 11, and the inclined walls 12 of the tray, at the ends thereof, are provided with openings 13 having the upper edges thereof formed with outstanding flanges 14. Besides these openings, one of the side inclined walls of the tray has a large opening or cut away portion 15 with the lower edge thereof provided with an upstanding flange 16, the openings 13 and 15 establishing communication between the interior of the tray and the interior of the pan.

It is therefore possible for an excess amount of lubricant within the tray 9 to enter the pan 1 and be removed therefrom by a pump forming part of the lubricant circulating system (not shown).

Similar to the pan 1, the tray 9 is preferably pressed from sheet metal by the use of suitable dies which provide the depressions constituting dipper troughs adapted for holding sufficient lubricant for connecting rods or parts thereof, as the lower ends of said rods dip into the troughs during the operation of an engine.

The inclined walls 12 of the tray 9 are formed with lateral marginal flanges 17 adapted to be held by the screw bolts 7 between the flanges 5 of the pan 1 and the lower edges of the crank case 8, and to prevent leakage at the flanges 5 and 17, a compressible gasket 18 is placed at the outer edges of the flange 17, between the flanges 5 and the lower edges of the crank case. The compressible gasket 18 is of greater thickness than the flanges 17 and said gasket is apertured to provide clearance for the screw bolts 7, so that said screw bolts may be tightened to compress the gasket 18 between the flanges 5 at the lower edge of the crank case, and thus establish a positive and non-leakable connection between the pan 1 and the crank case.

Since the tray 9 is stamped and pressed from sheet metal it is possible to have the dipper troughs 10 integral therewith, which is an advantage, but even then on account of the large size of the tray and pan, it is not always possible to have the entire flange area of each in a horizontal plane. This is due to the gage of the metal, handling and other causes, but it is always possible to have the tray 9 of such a size that it will fit within the pan. By reference to Fig. 2, it will be observed that the upper inclined edges or walls of the tray fit against the inclined walls 4 of the pan, adjacent the flanges 5, and by so nesting the tray and pan the former is always correctly positioned relative to the latter. Now, when the flanges 5 of the pan are connected to the lower edges of the crank case by the screw bolts 7, all unevenness or inequalities in the flanges are drawn out and both receptacles positively clamped against the crank case. It is therefore not necessary to resort to spot welding or soldering to hold the tray relative to the pan, nor to use such fastening means to establish a non-leakable connection, since it is practically impossible for lubricant to pass between the flanges 5 and 17, and more particularly the gasket 18 which is compressed between the flanges 5 and the crank case. This manner of connecting the pan and tray to the crank case permits of the same being easily removed and both thoroughly cleaned of any sediment or other matter that may accumulate within the pan or tray.

From the foregoing it is thought that the advantages of my construction will be apparent without further description, and while in the drawing there is illustrated a preferred embodiment of my invention, it is to be understood that the shape and size of the pan and tray may be varied and that other changes may be resorted to without departing from the scope of the invention as defined in the appended claim.

What I claim is:—

The combination of a crank case, a pan having marginal flanges connected to said crank case, a tray in said pan having marginal flanges between the flanges of said pan and said crank case, and a compressible gasket between the flanges of said pan and said crank case, said gasket being at the outer edges of the flanges of said pan and in a plane with the flange of said tray.

In testimony whereof I affix my signature in the presence of two witnesses.

WALTER A. FREDERICK.

Witnesses:
   W. R. ANGELL,
   D. ANDREWS.